United States Patent Office 3,822,184
Patented July 2, 1974

3,822,184
N¹⁶ REACTOR POWER MEASURING SYSTEM
Harald H. Weiss, Vienna, Austria, assignor to Westinghouse Electric Corporation, Pittsburgh, Pa.
Filed Dec. 30, 1970, Ser. No. 102,617
Int. Cl. G21c 17/02
U.S. Cl. 176—19                                    5 Claims

ABSTRACT OF THE DISCLOSURE

An $N^{16}$ reactor power measuring system is disclosed herein for measuring the thermal power of a nuclear reactor. The system includes a build-up simulator in a feedback loop to compensate for the incomplete decay of the $N^{16}$ in the coolant loop before the coolant is returned to the reactor.

Background of the Invention

This invention pertains to reactor power measuring systems and more particularly to an $N^{16}$ reactor power measuring system for measuring the thermal power of a nuclear reactor.

There are basically two methods of measuring the thermal power of a nuclear reactor. The first method is based on measuring the heat which is removed from the reactor by the coolant. This is usually accomplished by measuring the difference between the reactor coolant outlet and inlet temperatures and the amount of coolant flow. Such a system is described in the Curry patent, No. 3,423,285, entitled "Temperature Control for a Nuclear Reactor," filed Jan. 27, 1966, and assigned to the Westinghouse Electric Corporation. For accurate power measurements, this type of system requires that the heat losses from the reactor to the environment be taken into account even though they are small compared to the amount of heat transported by the coolant. The total heat generated can then be calculated from this information, however, the measurement of temperature differences and fluid flow implies inherent uncertainties and limited accuracy. Furthermore, the signals from the fast response temperature sensors in the coolant pipes have usually large noise coefficients, thus the difference between such signals becomes extremely noisy (up to approximately 30% of the signal).

The dynamic response of such measurements is characterized by an inherent time delay between the heat generation and its detection outside the reactor vessel. The reason for this is the thermal time constant of the fuel and the transport time of the coolant from the core to the temperature sensor.

The second method makes use of the formation of $N^{16}$ by the neutron activation of oxygen 16 contained in the water which comprises the reactor coolant. The $N^{16}$ content in the coolant is a direct measure of the total fast flux and thereby a direct measure of the total power generated. The decay of $N^{16}$ produces 6 m.e.v. gamma rays which can easily be measured outside the coolant pipes. This method has a faster time response than the first method mentioned above, because there is no fuel element time constant involved. However, the $N^{16}$ method has the disadvantage of a build-up effect of the $N^{16}$ activity in the coolant. This occurs if the total transport time in the coolant loop is too short to allow the complete decay of the $N^{16}$ activity and thus the coolant is still radioactive when it reenters the core.

Summary of the Invention

The objective of this invention is to compensate the $N^{16}$ signal for the aforementioned build-up effect and thus improve the dynamic response of the $N^{16}$ system. This is accomplished by simulating the build-up effect by digital or analog techniques or combinations of such techniques and subtracting the simulated signal from the total $N^{16}$ signal. The resultant $N^{16}$ signal is a true measure of the reactor power and closely follows every power change. If, for instance, the power changes by a step function the $N^{16}$ signal also changes by a step function, because the build-up portion of the signal is subtracted. Since the compensation is effective for a step change in power, it will be effective for any arbitrary power variation with time, because such a variation may always be considered as consisting of a series of superimposed small step changes.

Brief Description of the Drawings

For a better understanding of the invention, reference may be had to the exemplary embodiment shown in the accompanying drawings in which.

Description of the Preferred Embodiment

Nitrogen¹⁶ is a gamma emitting isotope with a 7.35 second half-life. The gamma activity is induced from oxygen¹⁶ by the bombardment of very fast neutrons (greater than 10 m.e.v.). The gamma activity, at 6 m.e.v., is the principal radiation emitted from the primary coolant of a pressurized water reactor. The activity is produced in the reactor core by very fast fission neutrons acting upon the oxygen in the reactor water coolant.

Instrumentation, such as ionization chambers which are well known in the art, have previously been developed to monitor the $N^{16}$ activity and, thus, provide a means for measuring the reactor power level. The $N^{16}$ power measurement system is a highly accurate method for measuring reactor power since the supply of fission neutrons is proportional to power, and the $N^{16}$ activity of the thoroughly mixed coolant water gives an integration of the differential power levels from all parts of the nuclear core. However, the $N^{16}$ power measurement method has the disadvantage of a build-up effect of the $N^{16}$ activity in the coolant. This occurs if the total transport time in the reactor coolant loop is too short to allow for the complete decay of the $N^{16}$ activity before the coolant reenters the reactor core. The resultant effect is to cause a cyclic increase in the $N^{16}$ signal which may be characterized by a build-up factor "$b$." The build-up factor "$b$" is represented by the equation:

$$b = \frac{e^{\lambda T}}{e^{\lambda T} - 1};$$

where

"$b$" equals the total steady state build-up of the $N^{16}$ signal due to a step change in reactor power;
"$\lambda$" equals the $N^{16}$ decay constant (0.0943 sec.⁻¹); and
"$T$" equals the total (coolant) loop transit time.

Figure 1:
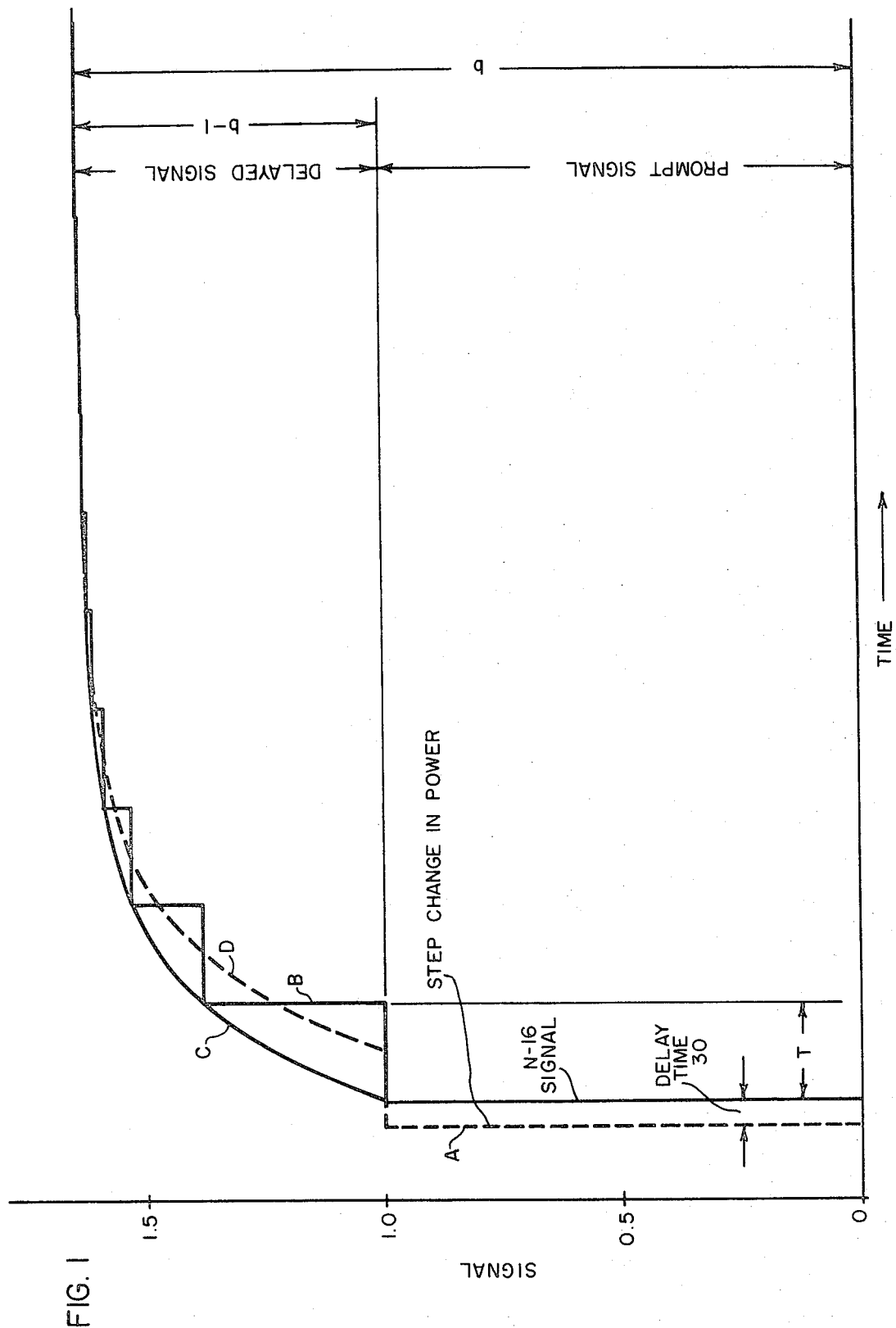
FIG. 1 is a graphical illustration of the $N^{16}$ signal versus time, illustrating the $N^{16}$ signal response to a unit step change in power.

With a loop transit time of $T = 10$ sec., for instance, $b$ becomes 1.632. This means that after a unit step change in reactor power 38.7% (0.632/1.632) of the signal appears delayed as shown in FIG. 1. FIG. 1 is a graphical representation of the $N^{16}$ signal versus time, illustrating the $N^{16}$ responsive to a step change in power. Curve A represents a unit step change in power within the reactor.

Curve B represents the corresponding $N^{16}$ signal, normalized to 1, as a function of time. It may be noted that there is an initial time delay between the initial reactor power step increase and the corresponding increase in the $N^{16}$ signal. This time delay, represented by reference character 30, is the time it takes the reactor coolant to reach the proximity of the $N^{16}$ detector. After the initial step change in the $N^{16}$ signal there are additional step changes, as may be seen from curve B in FIG. 1, due to the $N^{16}$ build-up effect. This is caused by the cycling of the reactor coolant through the coolant loop and continues until a steady state value "$b$" is reached. Therefore after the initial unit step change in signal $(b-1)/b$ or 38.7% of the signal appears delayed for a loop transit time of 10 seconds (as explained above). This considerably limits the dynamic response of such a system.

The objective of this invention is to correct the $N^{16}$ signal for the build-up effect and thus improve the dynamic response of the $N^{16}$ system. In accordance with the invention, the correction is accomplished by simulating the $N^{16}$ build-up signal and subtracting it from the total $N^{16}$ signal. The resultant $N^{16}$ signal is then a true measure of the reactor power and closely follows every power change. If, for instance, the power changes by a step function, as illustrated by curve A in FIG. 1, the $N^{16}$ signal also changes by a step function, after the time delay 30, as illustrated by curve B in FIG. 1. Thus, the build-up effect illustrated by curve B may be compensated for by providing a signal, approximating the build-up function, such as the signal C illustrated in FIG. 1, and then subtracting the aforementioned signal C from the $N^{16}$ signal. The resultant $N^{16}$ signal more nearly approximates the reactor step change in power, represented by curve A in FIG. 1. Since the compensation is effective for a step change in power, it will be effective for any arbitrary power variation with time because such a variation may always be considered as consisting of a series of superimposed small step changes.

Figure 2:
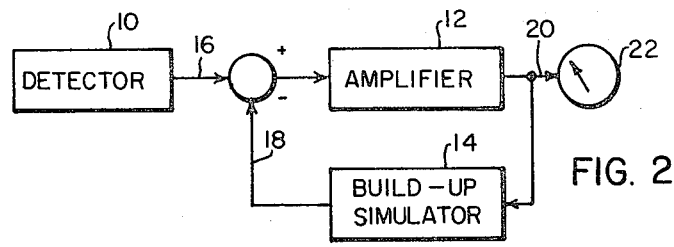
FIG. 2 is a block diagram illustrating the basic $N^{16}$ measuring system and build-up compensation means of this invention.

FIG. 2 shows the basic embodiment of this invention. The signal 16, from the $N^{16}$ detector 10 (which may be an ion chamber of conventional construction, not shown), is amplified by an amplifier 12 and connected to a build-up simulator 14 which provides the build-up function 18 for subtraction from the detector signal 16. The resultant signal 20 is connected to a readout device 22 (such as an ammeter).

The build-up simulator 14 generates the build-up signal 18 from the true $N^{16}$ power signal 16. This is accomplished by well-known digital or analog techniques or combinations of both methods, depending upon the accuracy desired. The simplest method of compensation is to approximate a stepped build-up function by a first-order exponential function with a time constant $\tau$. Such a function is illustrated by curve C in FIG. 1. $\tau$ can be calculated from the equation:

$$\tau = 1/\lambda = 10.62 \text{ sec.},$$

where "$\lambda$" equals the $N^{16}$ decay constant (0.0943 sec.$^{-1}$) and is independent of the loop transit time T. The amount of the delayed signal, as explained above, is calculated from the equation:

$$\text{delayed signal} = b - 1 = \frac{1}{e^{\lambda T} - 1}.$$

The accuracy of this simple approach is limited, however, no overshoot of the signal occurs. Furthermore, during normal reactor operation no ideal step change of power is expected. The actual power change always has a finite slope so that the deviation between the build-up function and the exponential approximation becomes smaller.

An additional improvement is to apply a time delay of about $T/2$ to the build-up approximation function as indicated in FIG. 1 by curve D. This curve is represented by the equation:

$$D(t) = (b-1)e^{-\frac{t}{\tau}};$$

where the function D varies with time $t$.

Thus, the deviation between the actual build-up signal B and the approximated function $D(t)$ is reduced.

Figure 3:
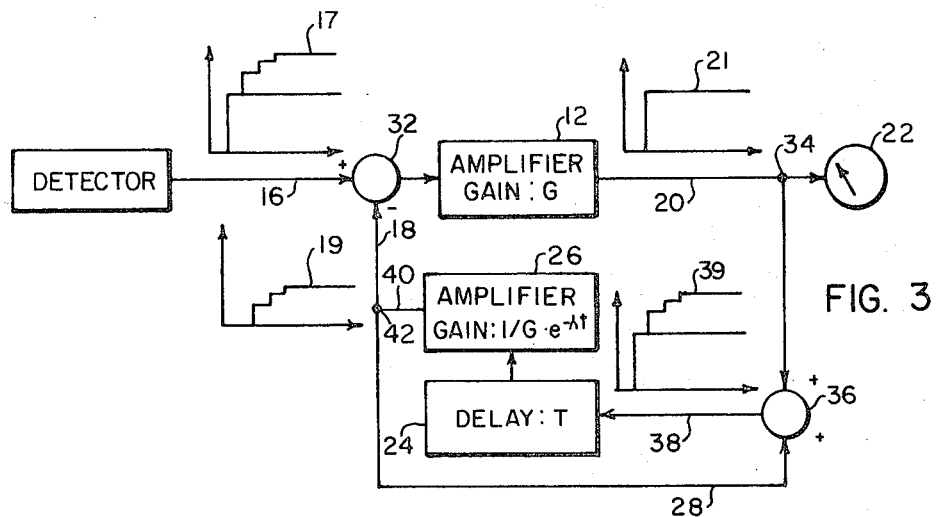
FIG. 3 is a block diagram of an alternative embodiment which allows for exact compensation of the $N^{16}$ build-up effect.
Figure 4:
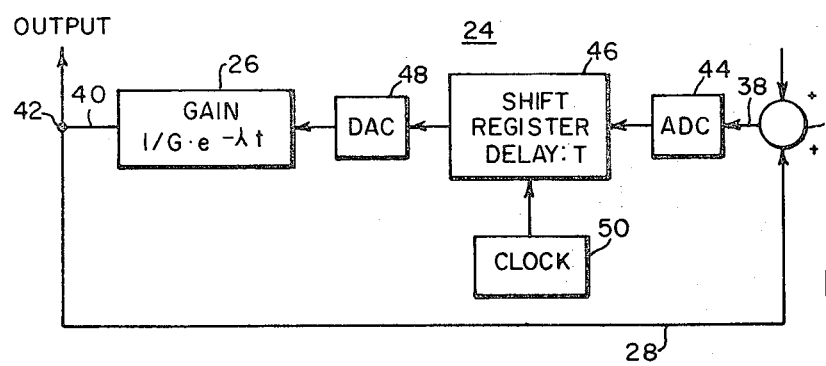
FIG. 4 is a more detailed block diagram of the $N^{16}$ build-up simulator of FIG. 3.

FIG. 3 shows an alternative method, which allows for exact compensation of the build-up effect. The feedback loop of the amplifier 12 consists of a time delay device 24 which can be adjusted to the transit time T and a variable gain amplifier 26 with the gain set to $$\frac{1}{G}e^{-(\lambda T)},$$

where G is any amplifier gain that produces a readable output signal. The delay T simulates the transit time, and the gain factor $$\frac{1}{G}e^{-(\lambda T)}$$

simulates the decay of the $N^{16}$ activity while circulating in the reactor coolant loop. There is an additional feedback loop 28 connected to the time delay device 24 and amplifier 26, which simulates the $N^{16}$ build-up as it occurs due to the cycling effect. The operation of this compensation circuit may be understood by reference to FIG. 3. The $N^{16}$ detector signal 16 as a function of time is illustrated by the graph represented by reference character 17. The graph 17 is the same graph illustrated in FIG. 1 by reference character B. The build-up function 18 is subtracted from the $N^{16}$ detector signal 16 at electrical junction 32. The resultant signal is then amplified by amplifier 12 which gives the true $N^{16}$ signal 20, graphically represented as a function of time by reference character 21. A portion of the signal 20 is displayed on the display unit 22, which is an electrically responsive readout, such as an ammeter calibrated for reactor power measurements. The remaining portion of the signal 20 is diverted into the $N^{16}$ build-up simulator feedback loop at electrical junction 34. This signal is then added to the cycling signal traversing feedback loop 28 at electrical junction 36. The resultant signal 38, graphically represented as a function of time by reference character 39 is then delayed by time T, the loop transit time, in delay unit 24 and amplified by a gain factor of $$\frac{1}{G}e^{-\lambda T}$$

in amplifier 26 as explained above. A portion of the resultant signal 40 forms the build-up function 18, graphically represented as a function of time by reference character 19, which is subtracted from the detector signal 16 at junction 32 as explained above. The remainder of the signal 40 is diverted at electrical junction 42 to form the feedback loop 28 signal. The signal in loop 28 simulates the $N^{16}$ build-up as it occurs due to the cycling of the $N^{16}$ activity in the coolant loop and is added to the signal 20 at electrical junction 36 as explained above. A standard digital shift register may be used as the time delay device 24 with an A/D (analog to digital) converter at the input, and a D/A (digital to analog) converter at the output. FIG. 4 shows a block diagram of the $N^{16}$ build-up simulator feedback loop of FIG. 3 with a standard digital shift register and its associated components substituted for the time delay device 24. In all other respects the build-up simulator of FIG. 4 is identical with that of FIG. 3. The signal 38 shown in FIG. 4 is the same signal represented by reference character 38 in FIG. 3. The signal 38 is changed from its analog form represented by reference character 39 in FIG. 3 to a digital signal by the analog to digital converter 44 shown in FIG. 4. Such converters are well known in the art and are readily available. The resultant digital signal then proceeds through the standard digital shift register 46. Digital shift registers are also well known in the art and often form a part of the memory section of digital computers. The digital signal is shifted from one position in the shift register to another position until the signal appears at the output of the shft register 46. The amount of time delay induced by the shift register 46, is controlled by the clock 50 which controls the rate of shift within the register 46. As mentioned above this delay time is adjusted to T, the loop transit time. The resultant signal at the output of the digital shift register 46 is then converted back into an analog signal by the digital to analog converter 48. The output of digital to analog converter is then amplified by the amplifier 26 which is identical to the amplifier 26 shown and described in FIG. 3. The remainder of the operation of the circuitry of FIG. 4 is identical with that of FIG. 3 as described above.

A different approach to the time delay device 24 shown in FIG. 3 includes the usuage of a magnetic tape recorder with an endless tape. The signal 38 is recorded at the input to the tape recorder and reproduced at the output. The time delay between the input and the output of the recorder may desirably be adjusted by adjusting the speed and length of the magnetic tape. However, the shift register is preferable because it is less expensive than the tape recorder and more reliable.

The resulting system provides an accurate method of measuring the power in a nuclear reactor with an improved dynamic response.

I claim as my invention:

1. An $N^{16}$ nuclear reactor power measuring system comprising monitoring means for monitoring the $N^{16}$ activity in the reactor coolant and producing a signal representative thereof, said monitoring means being connected to a readout for displaying said monitoring signal, a build-up simulator positioned between said readout and said monitoring means, said build-up simulator providing a signal substantially representative of the build-up effect of the $N^{16}$ activity in the reactor coolant and means for subtracting said build-up signal from said monitoring signal to produce a resultant monitoring signal at the readout which is substantially proportional to the reactor power.

2. Apparatus as in claim 1 wherein said monitoring means comprises at least one ion chamber.

3. Apparatus as in claim 1 wherein said build-up simulator produces a signal $B(t)$ substantially equal to:

$$(b-1)e^{-t/\tau};$$

where $$b = \frac{e^{\lambda T}}{e^{\lambda T}-1};$$

and where
$\lambda = N^{16}$ decay constant (0.0943 sec.$^{-1}$);
$T$ = total loop transit time; and
$\tau = 1/\lambda = 10.62$ sec.

4. Apparatus as in claim 1 wherein said build-up simulator comprises a first amplifier having a gain G and a first feedback loop, said first feedback loop comprising a time delay device having a delay time equal to the reactor coolant loop transit time T, and a second amplifier with a gain equal to $$\frac{1}{G}e^{-\lambda T},$$

where $\lambda$ equals the $N^{16}$ decay constant, said delay time T simulating the transit time through the reactor coolant loop and said gain factor $$\frac{1}{G}e^{-\lambda T}$$

simulating the decay of the $N^{16}$ activity while circulating in the reactor coolant loop, a second feedback loop connected between the output and the input of said first feedback loop in an additive relationship with said first feedback loop input and simulating the $N^{16}$ build-up as it occurs due to the cycling of the $N^{16}$ activity in the reactor coolant loop.

5. Apparatus as in claim 4 wherein said time delay device comprises a digital shift register with an analog to digital converter at the input and a digital to analog converter at the output.

References Cited

Nuclear Science Abstracts, Vol. 20, Apr. 30, 1966, p. 1721, No. 14019; Vol. 20, Mar. 31, 1966, p. 1286 No. 10430.

REUBEN EPSTEIN, Primary Examiner